United States Patent Office 3,066,744
Patented Dec. 4, 1962

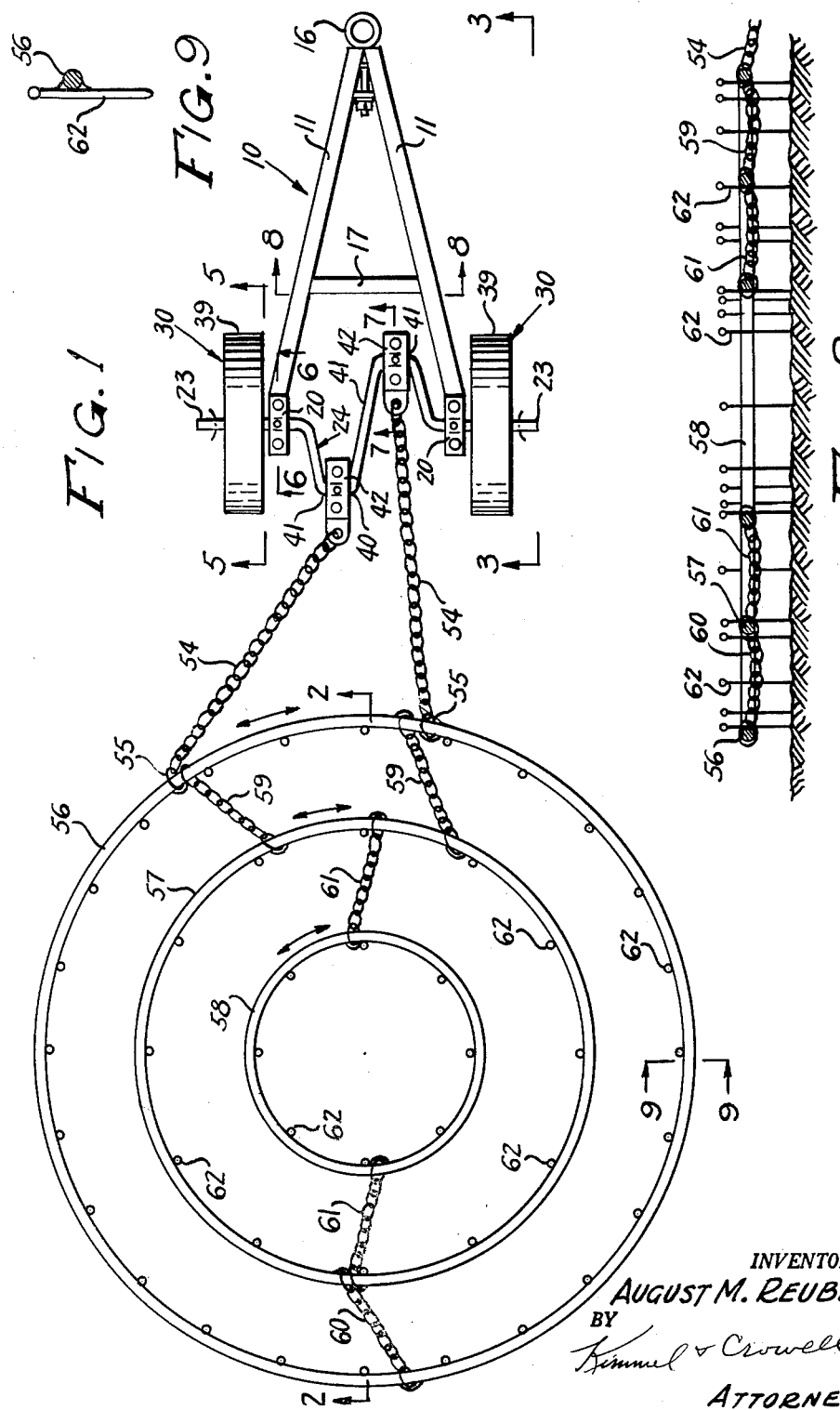

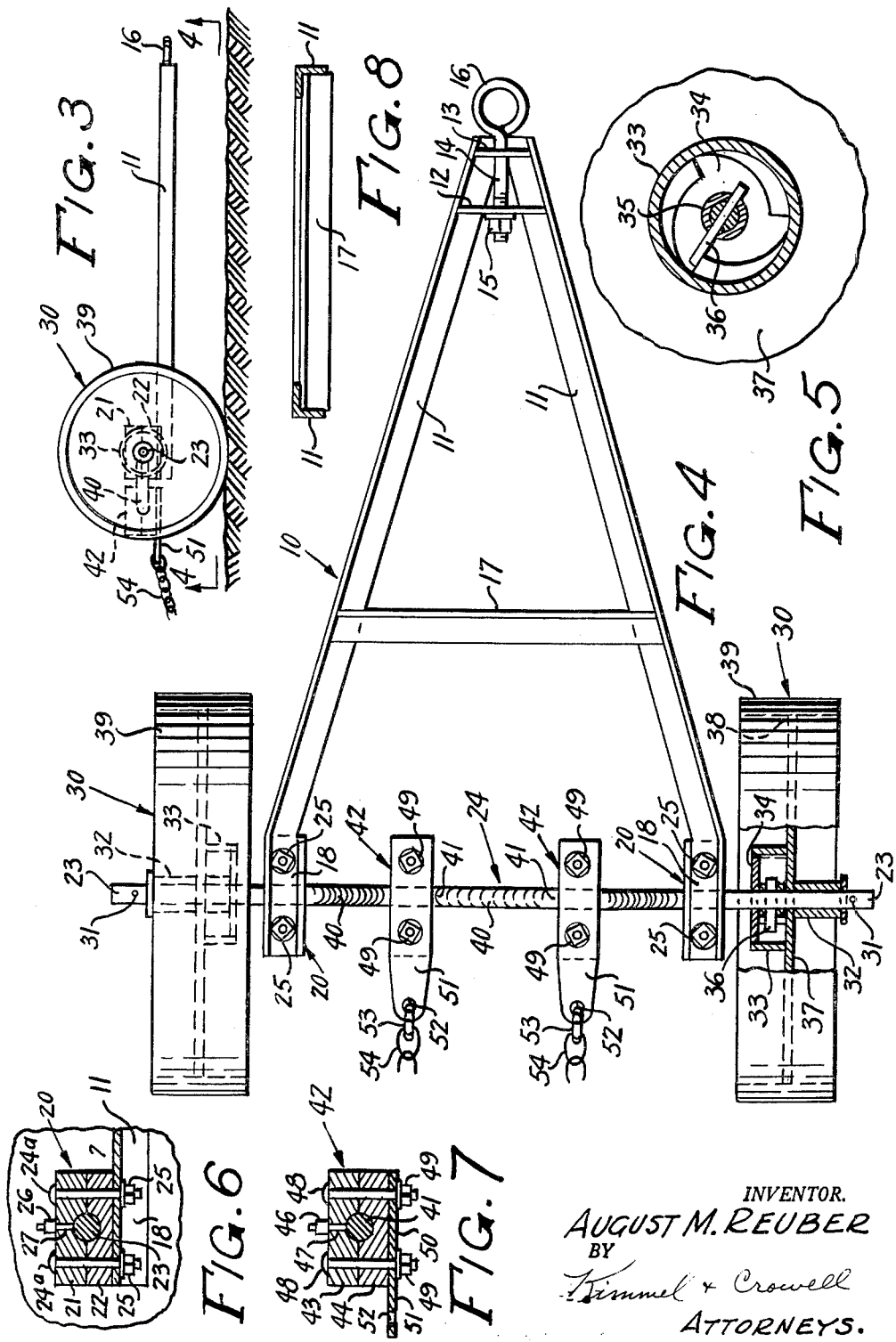

3,066,744
HARROW
August Mike Reuber, 270 N. Charlotte St., Albany, Oreg.
Filed Nov. 9, 1960, Ser. No. 68,227
1 Claim. (Cl. 172—110)

This invention relates to a harrow, and has as its primary object the provision of an improved harrow construction comprised of a plurality of concentric wings loosely connected together, and means for imparting reciprocatory rotary motion to the rings as the harrow is moved forwardly over the ground.

An additional object of the invention is the provision of an improved harrow of this character which will thoroughly harrow the ground, and at the same time smooth and level the ground as the device is advanced.

A further object of the invention is the provision of a device of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and shown in the accompanying drawings wherein there is disclosed a preferred embodiment of this inventive concept.

In the drawings:

FIGURE 1 is a plan view of one form of harrow embodying elements of the instant inventive concept.

FIGURE 2 is a sectional view taken substantially along the line 2—2 of FIG. 1 as viewed in the direction indicated by the arrows.

FIGURE 3 is a side elevational view taken substantially along the line 3—3 of FIG. 1 as viewed in the direction indicated by the arrows.

FIGURE 4 is an enlarged bottom plan view taken substantially along the line 4—4 of FIG. 3 as viewed in the direction indicated by the arrows.

FIGURE 5 is an enlarged fragmentary sectional view taken substantially along the line 5—5 of FIG. 1 as viewed in the direction indicated by the arrows.

FIGURE 6 is an enlarged sectional view taken substantially along the line 6—6 of FIG. 1 as viewed in the direction indicated by the arrows.

FIGURE 7 is an enlarged sectional view taken substantially along the line 7—7 of FIG. 1 as viewed in the direction indicated by the arrows.

FIGURE 8 is an enlarged sectional view taken substantially along the line 8—8 of FIG. 1 as viewed in the direction indicated by the arrows; and FIGURE 9 is an enlarged sectional view taken substantially along the line 9—9 of FIG. 1 as viewed in the direction indicated by the arrows.

Similar reference characters refer to similar parts throughout the several views of the drawing.

Having reference now to the drawings in detail, the device of the instant invention comprises a frame generally indicated at 10 which is formed of two converging angle iron members 11 which are connected at their apex by a pair of plates 12 and 13 apertured to receive an eye bolt 14 which is secured in position by means of a nut 15 and provided with an eye 16, which is adapted for attachment to any suitable towing vehicle, such as a tractor or the like.

A transverse angle iron connecting bar 17 extends between the angle iron members 11 at an intermediate point.

At their rear or diverging points the angle irons 11 are provided with parallel extremities 18, upon which are mounted bearing blocks generally indicated at 20. Each bearing block, as best shown in FIG. 6, comprises an upper member 21 and a lower member 22 which are provided with semi-circular aligned recesses for the reception of the ends 23 of an axle member generally indicated at 24, to be more fully described hereinafter. The assembled blocks are held on the portions 18 by means of bolts 24a and nuts 25, and a suitable lubricant fitting 26 extending through a bore 27 communicates with the axle ends 23. The oppositely disposed members 20 are substantially identical.

Suitable wheels 30 are mounted on each axle end 23 and are secured in position as by means of cotter pins 31 or the like. Each wheel, as best shown in FIG. 4, includes a sleeve 32 and a housing 33, which latter contains a clutch mechanism comprised of a cam disk 34, which is secured to a sleeve 35 and held in position on the axle end 23 by means of suitable pin 36, all as best shown in FIG. 5.

Each wheel 30 includes a wheel disc 37 and at the periphery 38 of which is mounted a steel or steel-banded tire 39. The clutch assembly previously described acts in the same manner as the differential on an automobile, so that as the apparatus is turned one wheel will advance while the other remains substantially stationary.

Referring now to the axle 34, it will be seen that the ends 23 are in aligned relation, but the axle is provided with two oppositely disposed offset portions 40, angularly dsiposed relative to each other, and each including a bight portion 41 upon which is mounted a bearing block generally indicated at 42. The bearing blocks 42 are substantially identical in construction to those previously described on the ends 23 of the axle, and each comprises an upper plate 43 and a lower plate 44 which are provided with confronting semi-circular recesses surrounding the bight portions 41 of the offset members 40. A grease fitting 46 communicates with a bore 47 for lubricating the bights, and the upper and lower blocks 43 and 44 are held in position by means of bolts 48 and nuts 49. The bolts 48 pass through suitable apertures in metallic plates 50, which have extending end portions 51 provided with openings 52.

Positioned in each of the openings 52 is a link 53 comprising the end portion of a chain 54. The chains 54 are fixedly connected as by end loops 55 to spaced apart portions of the outermost ring 56 of a harrow assembly comprised of a plurality of concentric rings 56, 57, and 58. Ring 56 is connected by chains 59 to the next adjacent ring 57, the chains 59 extending from points closely adjacent the eyes 55 to spaced apart points on the inner ring 57 and being suitably secured in position as by welding. The opposite side of the device is provided with a chain 60 which connects the portion of ring 56 opposite the towing vehicle 10 to a corresponding inner, but offset portion of the ring 57. Single chains 61 on opposite sides of ring 57 connect to fixed adjacent points on the inner ring 58. Each ring is provided with a plurality of harrowing pins 62, the pins being substantially identical, and welded to the ring as best shown in FIG. 9. Although a welded construction is here shown, it is to be understood that suitable removable pins may be employed if desired, and secured in position as by means of clamps. Similarly, while the rings 56, 57, and 58 have been indicated as solid, they may be tubular, and apertured to receive the pins 62, if desired.

From the foregoing the use and operation of the device should now be readily understandable.

As the towing device 10 is moved forwardly by means of a tractor or similar towing vehicle, the wheels 30 are rotated, and cause rotation of the axle 24, which, by alternate movement of the offset bights 41 occasions alternate forward pull on one of the chains 54. This in turn causes oscillatory rotative movement of the outer ring 55, which is transmitted reversely through chains 55 to the next adjacent ring 57, and thence through chain 61 to the inner ring 58.

By virtue of this arrangement a very effective harrowing and leveling arrangement is provided, which effectively accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

A harrow comprising, in combination, a wheeled towing vehicle including a transversely extending axle having a pair of oppositely disposed offset portions in angular relation to each other intermediate its ends, a harrow assembly comprising a plurality of concentric rings each having circumferentially spaced, downwardly extending harrow points secured thereto, a first pair of flexible chains each connected at one end to diametrically opposite points on the innermost of said rings and at their opposite ends to diametrically opposite points on an intermediate ring to provide an elongated flexible connection between said innermost and intermediate rings, a flexible chain connected at one end to said intermediate ring adjacent the connection thereto of one of said first pair of chains and at its other end to the outermost ring, a second pair of flexible chains each connected at one end to circumferentially spaced points on said intermediate ring on opposite sides of the connection thereto of the other of said first pair of chains and at their other ends to circumferentially spaced points on said outermost ring to provide an elongated flexible connection between said intermediate and outermost rings, a third pair of flexible chains each connected at one end to the outermost ring adjacent the connection thereto of said second pair of chains and at their opposite ends to the offset portions of said axle whereby upon rotation of said axle oscillatory rotary movement will be imparted to said rings.

References Cited in the file of this patent

UNITED STATES PATENTS

| | | |
|---|---|---|
| 66,684 | Densmore | July 16, 1867 |
| 280,602 | Gerstner | July 3, 1883 |
| 908,721 | Anderson | Jan. 5, 1909 |
| 1,629,678 | Burrow | May 14, 1927 |
| 2,280,372 | Carlson | Apr. 21, 1942 |

OTHER REFERENCES

Koskenmaki, German application 1,005,777, printed April 4, 1957 (Kl. 45a 41).